(12) United States Patent
Pinard et al.

(10) Patent No.: US 7,055,308 B2
(45) Date of Patent: Jun. 6, 2006

(54) DETONATION DAMPER FOR PULSE DETONATION ENGINES

(75) Inventors: Pierre Francois Pinard, Clifton Park, NY (US); Anthony John Dean, Scotia, NY (US); Adam Rasheed, Latham, NY (US)

(73) Assignee: General Electric Company, Niskayuna, NY (US)

( * ) Notice: Subject to any disclaimer, the term of this patent is extended or adjusted under 35 U.S.C. 154(b) by 414 days.

(21) Appl. No.: 10/452,422

(22) Filed: May 30, 2003

(65) Prior Publication Data

US 2004/0237504 A1  Dec. 2, 2004

(51) Int. Cl.
  *F02K 5/02* (2006.01)
  *F02C 7/24* (2006.01)
(52) U.S. Cl. .......... 60/247; 60/248; 60/39.38; 60/725; 60/39.76; 181/220; 181/221
(58) Field of Classification Search ................. 60/247, 60/248, 39.38, 725, 754, 39.76; 181/213, 181/220, 222
See application file for complete search history.

(56) References Cited

U.S. PATENT DOCUMENTS

| | | | |
|---|---|---|---|
| 2,888,803 A * | 6/1959 | Pon | 60/39.38 |
| 4,762,487 A * | 8/1988 | Zappa | 431/1 |
| 4,767,313 A * | 8/1988 | Lockwood, Jr. | 431/1 |
| 5,267,513 A | 12/1993 | Guirguis et al. | |
| 5,864,517 A | 1/1999 | Hinkey et al. | |
| 5,873,240 A | 2/1999 | Bussing et al. | |
| 5,937,635 A | 8/1999 | Winfree et al. | |
| 6,003,301 A | 12/1999 | Bratkovich et al. | |
| 6,349,538 B1 | 2/2002 | Hunter, Jr. et al. | |
| 6,439,503 B1 | 8/2002 | Winfree et al. | |
| 6,442,930 B1 | 9/2002 | Johnson et al. | |
| 6,477,829 B1 | 11/2002 | Hunter et al. | |
| 6,505,462 B1 | 1/2003 | Meholic | |
| 6,516,605 B1 | 2/2003 | Meholic | |
| 6,550,235 B1 | 4/2003 | Johnson et al. | |
| 6,688,107 B1 * | 2/2004 | Ono et al. | 60/725 |
| 6,886,325 B1 * | 5/2005 | Norris et al. | 60/39.34 |
| 2002/0166318 A1 | 11/2002 | Baker et al. | |
| 2003/0029161 A1 | 2/2003 | Hunter, Jr. | |
| 2003/0029162 A1 | 2/2003 | Baker | |

* cited by examiner

*Primary Examiner*—Charles G. Freay
(74) *Attorney, Agent, or Firm*—Penny A. Clarke; Patrick K. Patnode

(57) ABSTRACT

An engine includes at least one pulse detonation chamber configured to receive and detonate a fuel and an oxidizer. The pulse detonation chamber has an outlet end and includes a porous liner adapted to fit within an inner surface of the pulse detonation chamber within a vicinity of the outlet end. The engine also includes a casing housing the pulse detonation chamber.

27 Claims, 15 Drawing Sheets

DETONATION DAMPER FOR PULSE DETONATION ENGINES

BACKGROUND OF THE INVENTION

The invention relates generally to detonation damping for pulse detonation applications and, more particularly, to noise reduction and the reduction of transient loads on downstream components via detonation damping. As used herein, the phrase "detonation damping" generally refers to a process by which (1) the transverse waves required to sustain a detonation are attenuated and/or (2) the curvature of the leading shock wave is increased, thereby reducing its strength.

Pulse detonation engines are a promising propulsion technology, in view of the lower entropy rise of detonative processes, as compared to constant pressure deflagration. Consequently, pulse detonation engines have the potential to propel vehicles at higher thermodynamic efficiencies than are achieved with deflagration-based engines.

However, pulse detonation engines pose potential noise problems. In addition, components downstream of detonations, for example components downstream of a pulse detonation engine core assembly in a hybrid turbine-pulse detonation engine, may be subjected to substantial transient loads from the detonations. Accordingly, it would be desirable to reduce the noise and transient loads for pulse detonation engines.

BRIEF DESCRIPTION

Briefly, in accordance with one embodiment of the present invention, an engine is disclosed. The engine includes at least one pulse detonation chamber configured to receive and detonate a fuel and an oxidizer. The pulse detonation chamber has an outlet end and includes a porous liner adapted to fit within an inner surface of the pulse detonation chamber within a vicinity of the outlet end. The engine further includes a casing housing the pulse detonation chamber.

Another engine embodiment is also disclosed. The engine includes at least one pulse detonation chamber, configured to receive and detonate a fuel and an oxidizer. The pulse detonation chamber has an outlet end. The engine further includes a transition piece disposed downstream from the pulse detonation chamber and configured to modify the velocity profile of the high pressure gas exiting the pulse detonation chamber. The engine also includes a detonation damper adapted to dampen a plurality of shock waves generated by the pulse detonation chamber.

Yet another engine embodiment is disclosed. The engine includes at least one pulse detonation chamber configured to receive and detonate a fuel and an oxidizer. The pulse detonation chamber has an outlet end. The engine further includes a casing housing the pulse detonation chamber. The casing includes a porous liner adapted to fit within an inner surface of the casing downstream of the outlet end.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
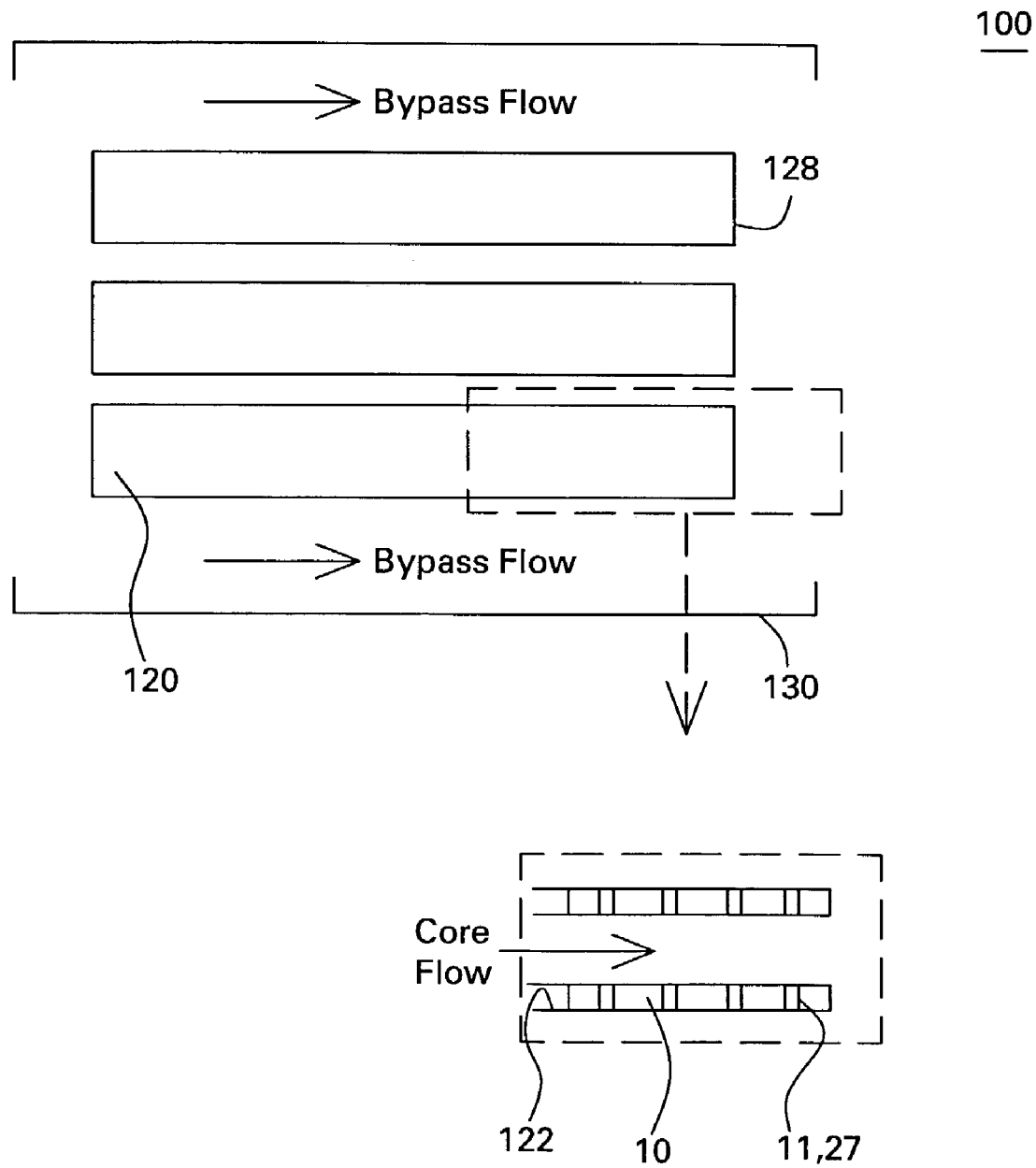
FIG. 1 illustrates a first engine embodiment of the invention.

A first embodiment is described with respect to FIG. 1. As shown in FIG. 1, an engine 100 includes at least one pulse detonation chamber 120 configured to receive and detonate a fuel and an oxidizer. The pulse detonation chamber 120 has an outlet end 128 and includes a porous liner 10, which is adapted to fit within an inner surface 122 of the pulse detonation chamber 120 within a vicinity of the outlet end. The engine 100 further includes a casing 130 housing the pulse detonation chamber(s) 120. As shown in FIG. 1, core flow is through PDC(s) 120 and bypass flow is around PDC(s) 120. As used here, the phrase "within the vicinity of the outlet end 128" means that the porous liner 10 is closer to the outlet end 128 than it is to the front of the PDC 120. Although illustrated as extending to the outlet end 128, it is not imperative that the porous liner 10 do so. Rather, by positioning the porous liner 10 within the vicinity of the outlet end 128, the detonations are damped. In addition, porous liner 10 reduces the amplitude of the subsequent shock on any downstream components. In this manner, noise and transient loads on any downstream components are reduced.

As used herein, a "pulse detonation chamber" (or "PDC") is understood to mean any combustion device or system where a series of repeating detonations or quasi-detonations within the device cause a pressure rise and subsequent acceleration of the combustion products as compared to the pre-burned reactants. A "quasi-detonation" is a combustion process that produces a pressure rise and velocity increase higher than the pressure rise produced by a deflagration wave. Typical embodiments of PDC's include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the PDC exhaust to produce a thrust force. As known to those skilled in the art, pulse detonation may be accomplished in a number of types of detonation chambers, including detonation tubes, shock tubes, resonating detonation cavities and annular detonation chambers.

As noted above, acoustic and transient loads produced by PDC's pose noise and structural challenges, respectively. Beneficially, incorporation of porous liner 10 into PDC 120 near the outlet end 128 thereof helps reduce both the acoustic and transient loads produced by PDC 120 as follows. When the detonation encounters the porous surface of porous liner 10, mass flow into and/or through the pores 11: (1) attenuates the transverse waves required to sustain the detonation and/or (2) increases the curvature of the leading shock wave, thereby reducing its strength. Consequently, the exhaust from PDC 120 creates a lower and more gradual pressure rise, reducing both noise and the impact on downstream components and on surrounding components, such as casing 130. Because of the adverse impact of porous liner 10 on detonations, porous liner 10 is shorter than PDC 120, to facilitate detonations in PDC 120, according to a particular embodiment.

Figure 2:
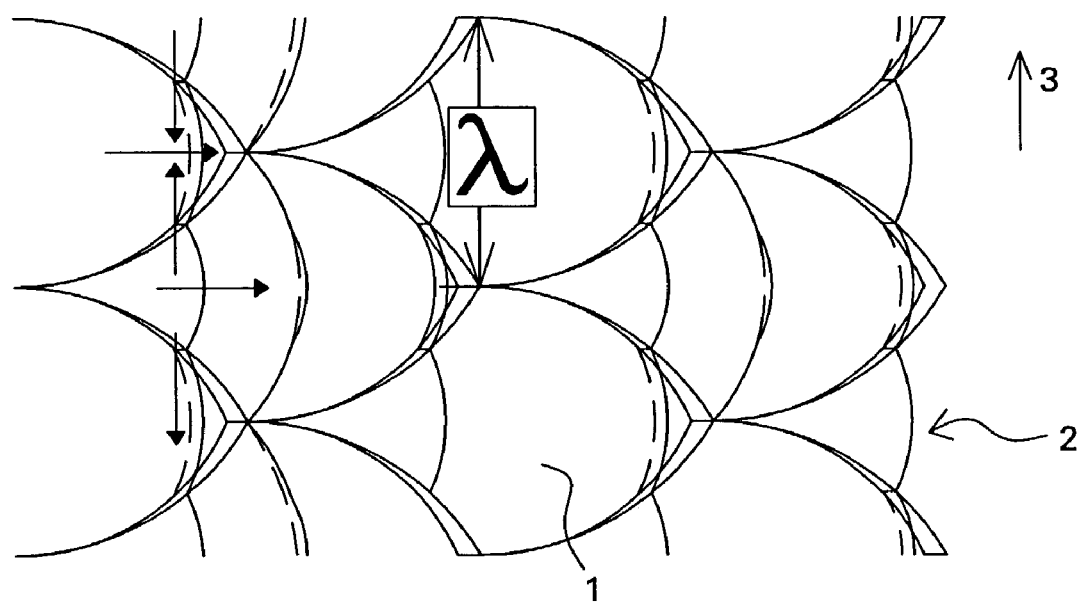
FIG. 2 illustrates a cellular pattern for detonation.

More particularly, porous liner 10 is at least about one cell size $\lambda$ in length. To further enhance detonation damping, porous liner 10 is more particularly, at least about four cell sizes $\lambda$ in length. As is known to those skilled in the art, cell size $\lambda$ is a fundamental property of detonations. More particularly, cell size $\lambda$ is a function of the initial temperature $T_0$ and pressure $P_0$ and of the detonation mixture, namely of the fuel and oxidizers composing the detonation mixture. A schematic diagram of a cellular structure 1 associated with detonations is illustrated in FIG. 2. A cellular pattern 2 results from interactions between transverse shock waves traveling in a transverse direction 3 behind the detonation. The intersection points (or "triple points") of transverse shock waves have high local temperature T and pressure P values, and detonation is seeded at triple points. Cell size $\lambda$ depends on the initial fuel-air composition, temperature $T_0$ and pressure $P_0$. Both $T_0$ and $P_0$ vary over the operating envelope of the engine. Therefore, the length of the porous liner 10 is preferably selected to cover the range of expected cell size, $\lambda$.

Figure 3:
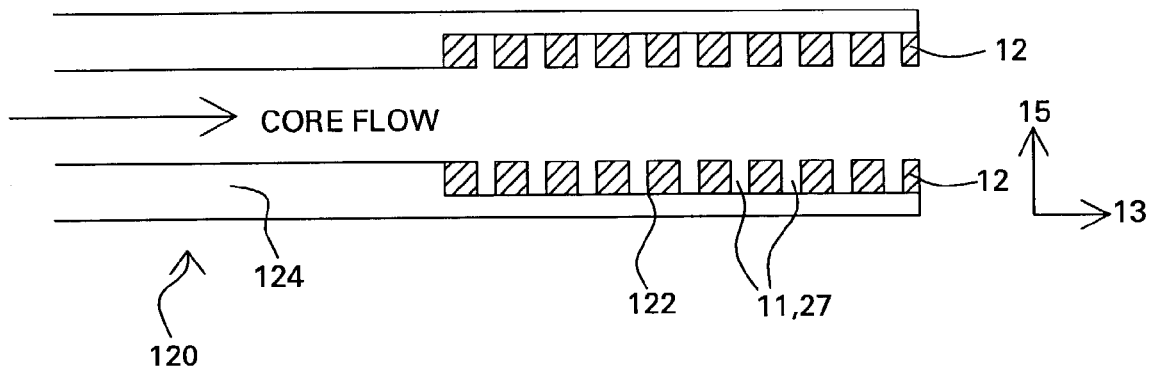
FIG. 3 illustrates a perforated liner embodiment of a porous liner, in a partial, cross-sectional view taken along a length of a pulse detonation chamber ("PDC")
Figure 4:
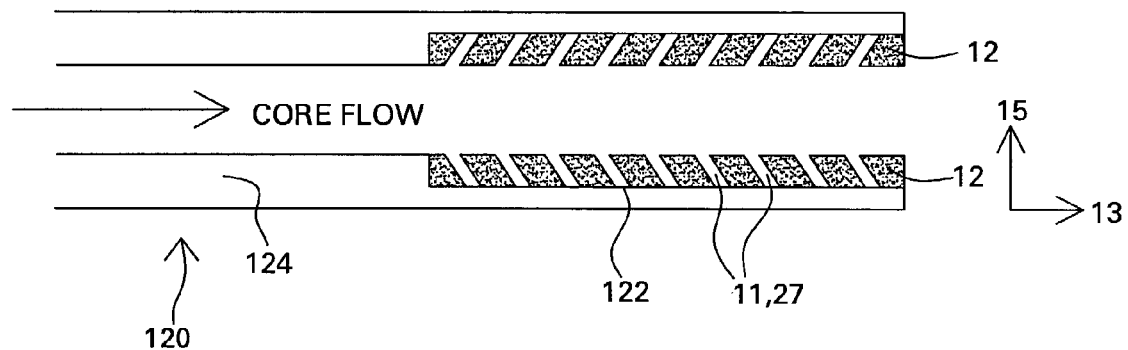
FIG. 4 illustrates another perforated liner embodiment of the porous liner, in a partial, cross-sectional view taken along the length of a PDC.

For the embodiments illustrated in FIGS. 3 and 4, the porous liner 10 comprises a perforated liner 12 attached to the inner surface 122 of the respective pulse detonation chamber 120. For example, the perforated liner 12 is press-fit or welded to the chamber wall 124 of the pulse detonation chamber 120. More particularly, for the embodiments of FIGS. 3 and 4, perforated liner 12 is flush with the chamber wall 124, as shown. Perforated liner 12 is preferably formed of a material or materials that can withstand the high temperatures and stresses present in the detonation chamber of a pulse detonation chamber 120. Exemplary materials include metals, metal alloys, ceramics, for example stainless steel, Inconel, Molybdenum and Titanium. Exemplary liner assembly thicknesses are in a range of about ⅛ inch to about 1 inch and, more particularly, in a range of about ¼ inch to about ½ inch, for a typical PDC flow-through diameter of about two inches. Liner assembly thickness varies with application, depending on the fuel and PDC flow-through diameter.

Figure 14:
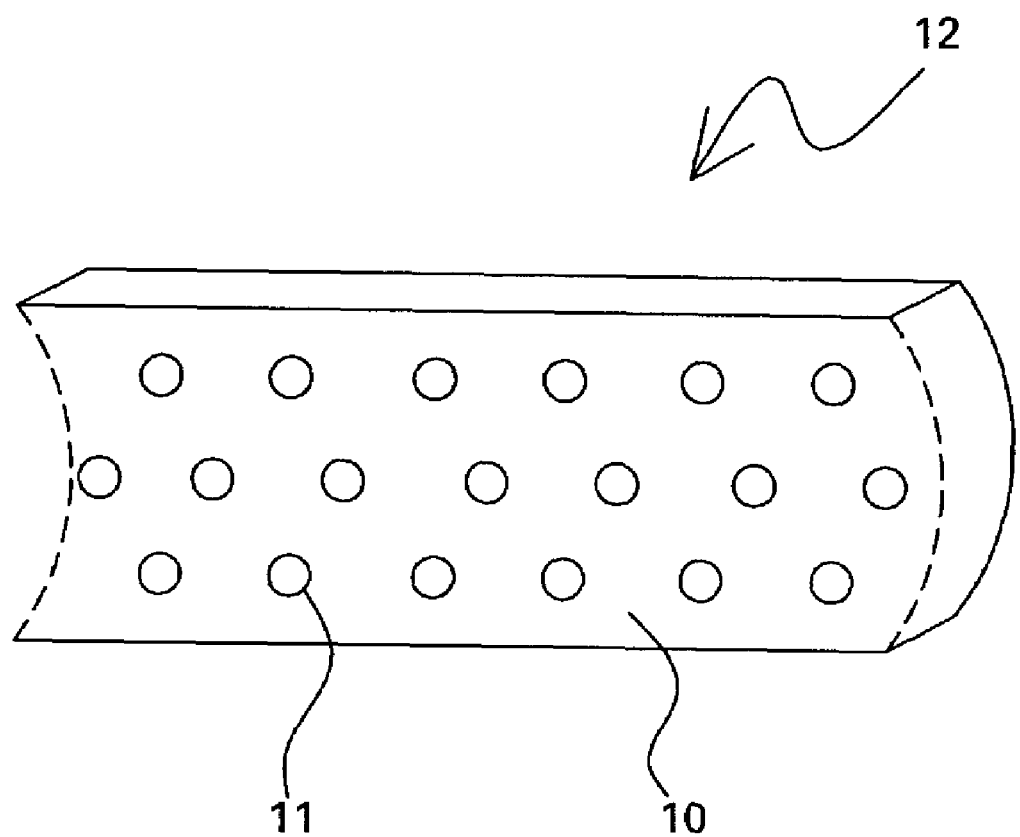
FIG. 14 shows the perforated liner of FIG. 3 or 4, where the perforated liner defines a number of discrete holes.

More particularly, for the embodiment illustrated in FIGS. 3 and 14, the perforated liner 12 defines a number of holes 11 oriented perpendicular to the surface 13 of perforated liner 12. As used herein, the term "perpendicular" should be understood to mean holes 11 drilled substantially perpendicular to the surface 13 of the perforated liner 12, for example within about ten degrees (10°) of the surface normal 15. For the embodiment shown in FIGS. 4 and 14, the perforated liner 12 defines a number of holes 11 angled relative to the surface normal 15. For both embodiments, the holes 11 may be through-holes (as shown) or blind holes (not shown). Beneficially, the configuration of FIG. 4 has an increased hole length, for a given perforated liner 12 thickness relative to the arrangement of FIG. 3. In contrast, the arrangement of FIG. 3 has less of a negative impact on thrust than does the arrangement of FIG. 4. The ratio of holes 11 to solid portions of the perforated liner 12, $V_{open}/V_{solid}$, affects the damping of the liner 12. This ratio $V_{open}/V_{solid}$ represents the porosity of the liner 12. To enhance damping, the porosity exceeds about thirty percent (30%) and, more particularly, is in a range of about fifty percent (50%) to about seventy percent (70%), for particular embodiments. In addition, the holes 11 may be filled with a damping material (not shown here), to enhance detonation damping.

Figure 15:
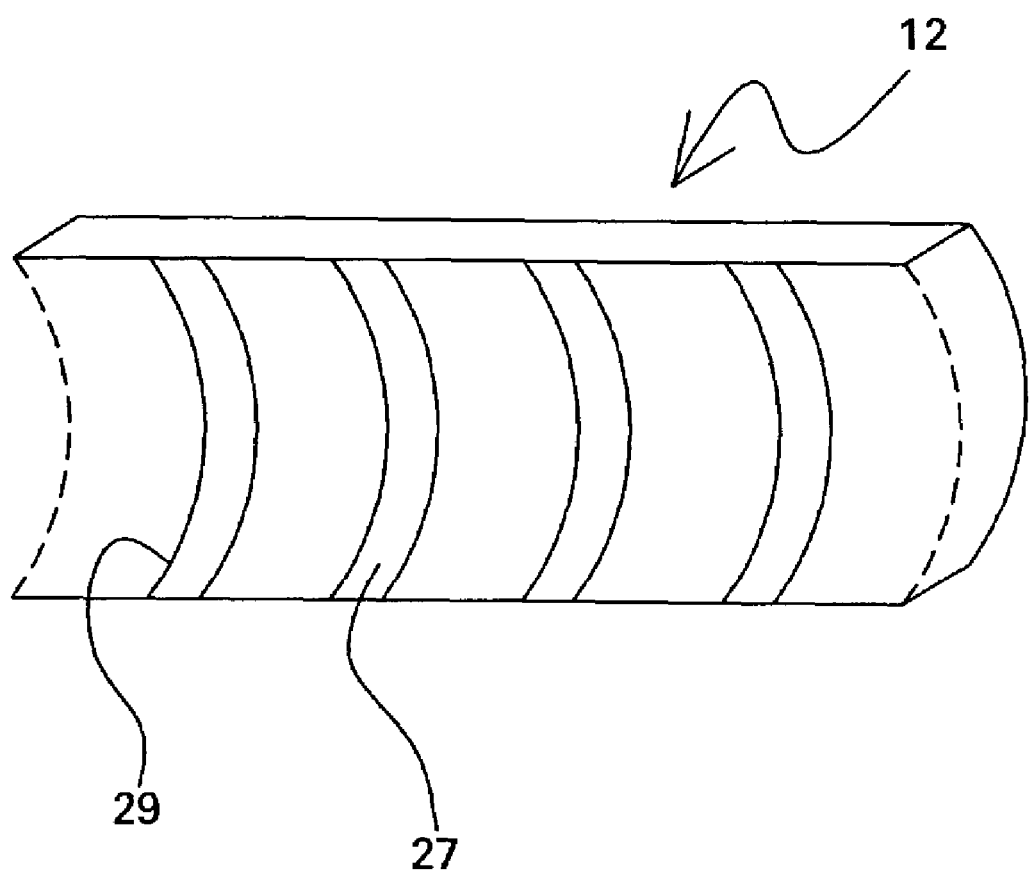
FIG. 15 shows the perforated liner of FIG. 3 or 4, where the perforated liner defines a number of annular cavities.

Alternate embodiments to those described above with respect to FIGS. 3, 4 and 14 are described with reference to FIGS. 3, 4, and 15. In place of the discrete holes 11 shown in FIG. 14, the perforated liner 12 shown in FIG. 15 defines a number of annular cavities 27 (or slots 27). The annular cavities 27 may have edges 29 normal to the surface 13 of the perforated liner 12, as shown in FIG. 3. Alternatively, the edges 29 may be angled relative to surface 13. A combination of discrete holes 11 and annular cavities 27 may also be employed.

Figure 5:
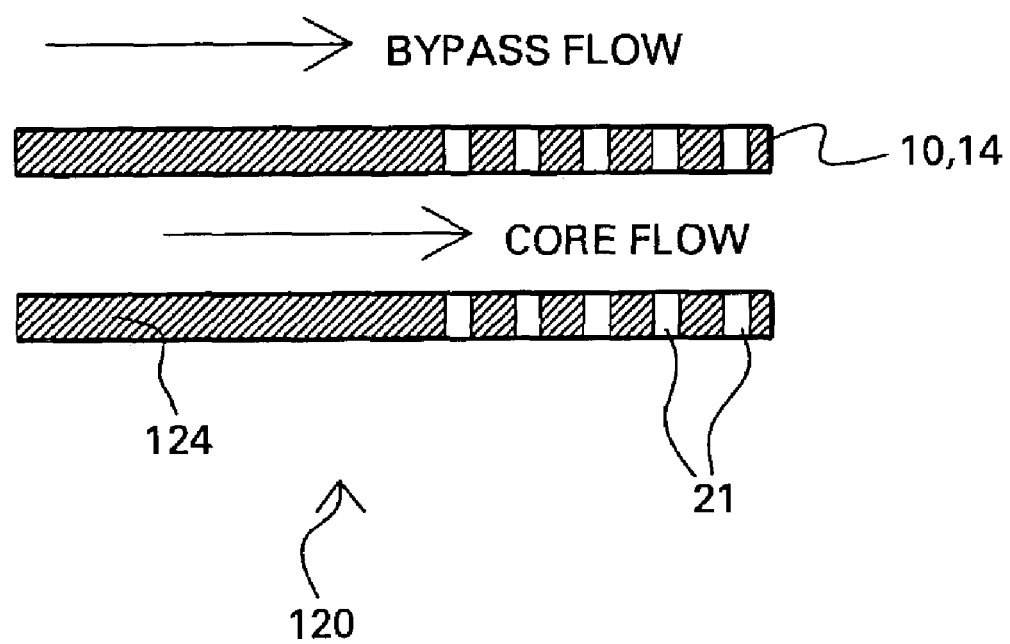
FIG. 5 depicts an embodiment of the porous liner that is integral to the chamber wall of a pulse detonation chamber, in a partial, cross-sectional view taken along the length of a PDC.

Another embodiment is shown in FIG. 5, for which the porous liner 10 comprises a porous section 14 of a chamber wall 124 of pulse detonation chamber 120. For this embodiment, the porous liner 10 is integral to the pulse detonation chamber 120 and comprises a number of holes 21 formed in the chamber wall 124 of the pulse detonation chamber 120. The holes 21 may be through-holes as shown to allow communication with the bypass flow. Alternatively, the holes 21 may be angled relative to surface 14.

Figure 6:
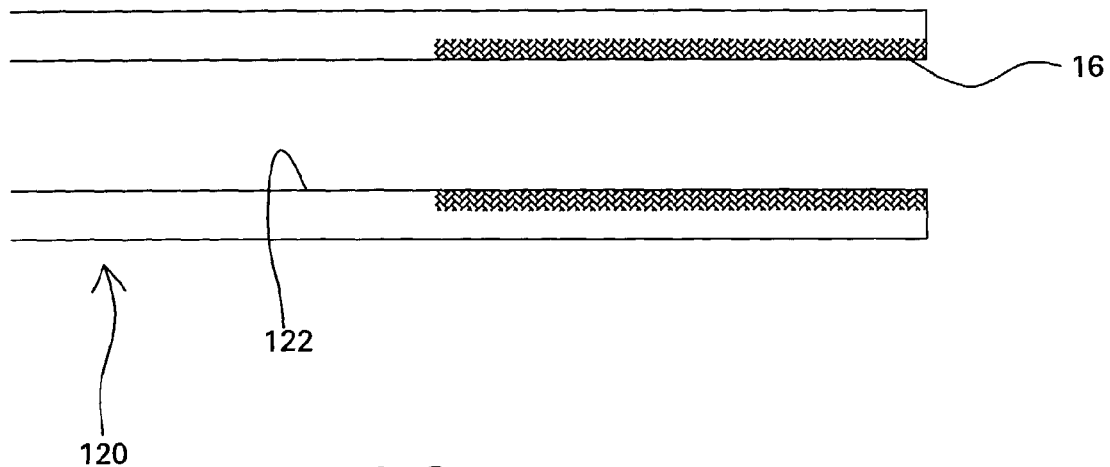
FIG. 6 depicts another embodiment of the porous liner, in a partial, cross-sectional view taken along the length of a PDC.

For the embodiment illustrated in FIG. 6, the porous liner 10 comprises a material 16 such as metal fiber material, for example a sintered metal fiber material or a woven metallic material 16, which is affixed to the inner surface 122 of the pulse detonation chamber 120. The material can be attached such that the surface is flush with the upstream detonation chamber liner surface, or simply attached on the surface of the detonation liner. Other materials that absorb or damp acoustic energy and are designed to withstand high temperatures may also be employed.

Figure 7:
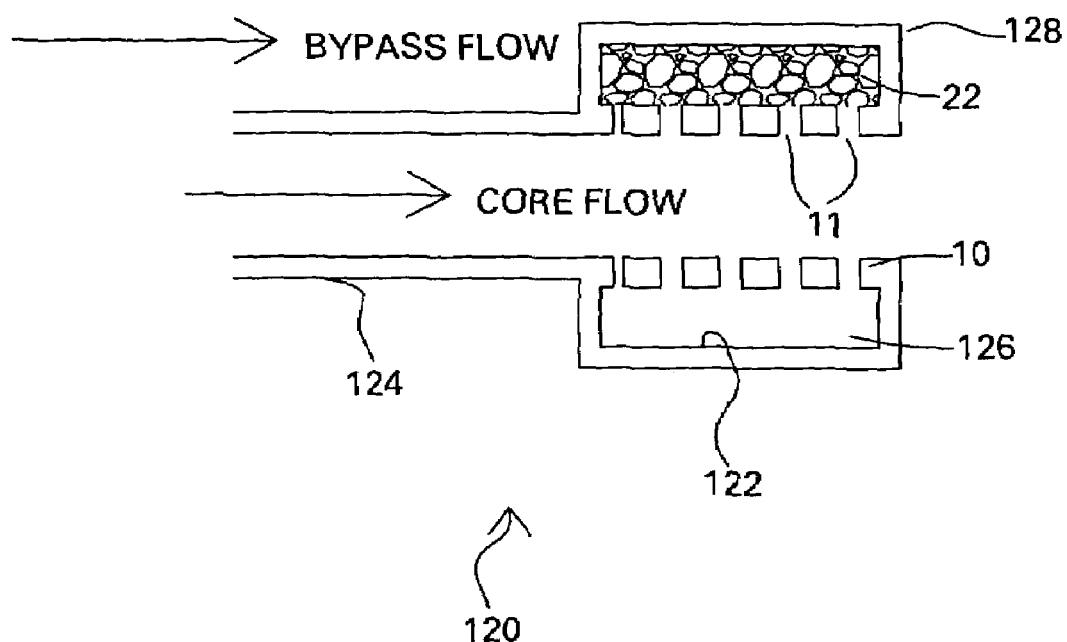
FIG. 7 shows a porous liner separated from an inner surface of a pulse detonation chamber by a gap, in a partial, cross-sectional view taken along the length of a PDC.
Figure 8:
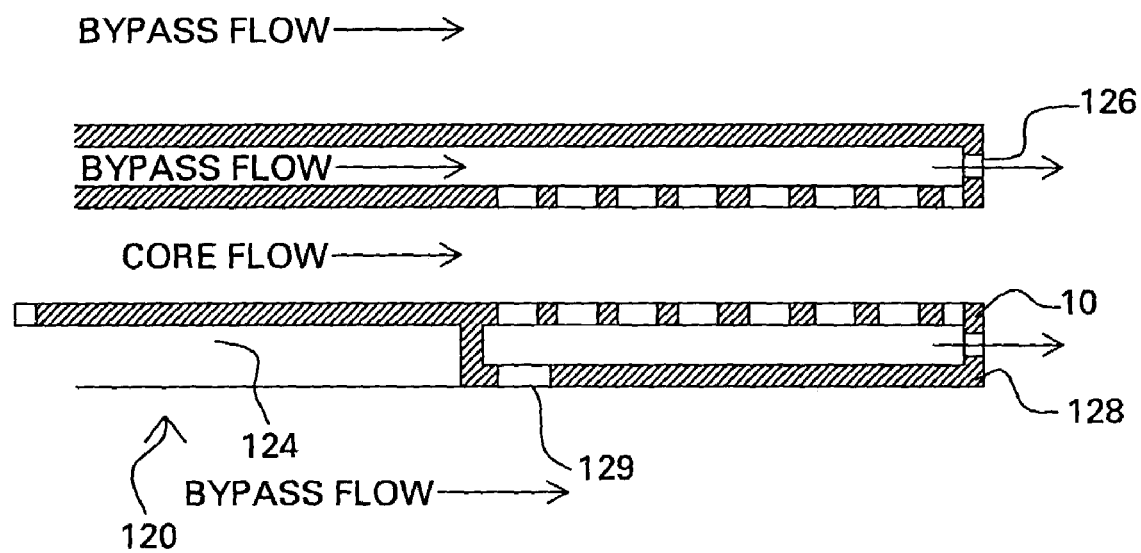
FIG. 8 shows a porous liner separated from the inner surface of a pulse detonation chamber by a gap, which is configured for bypass flow, in a partial, cross-sectional view taken along the length of a PDC.
Figure 9:
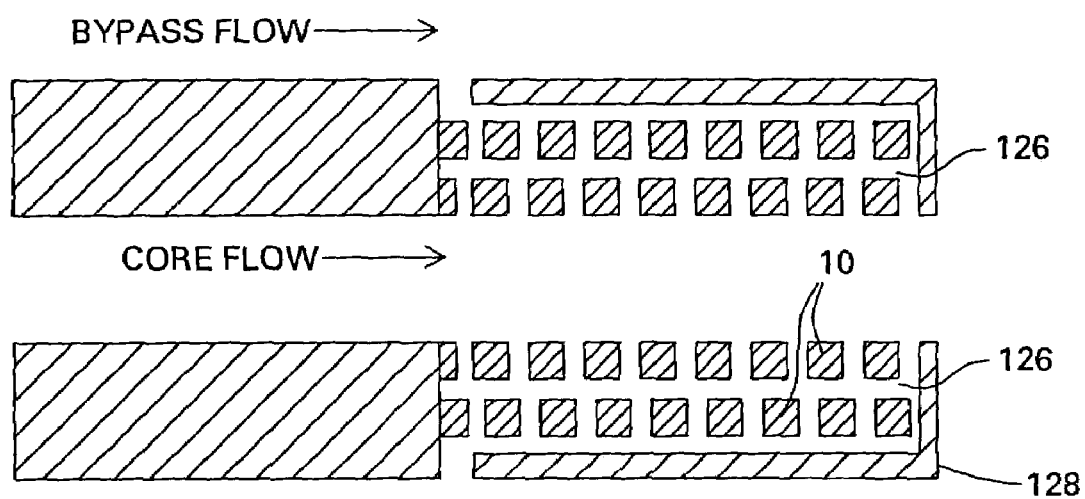
FIG. 9 illustrates an exemplary multi-porous liner embodiment, in a partial, cross-sectional view taken along the length of a PDC.

Another embodiment is illustrated in FIGS. 7 and 8. For this embodiment, a gap 126 is provided behind the porous liner 10. The porous liner 10 is in fluid communication with the gap 126. For example, the porous liner 10 has through-holes 11 that provide fluid communication with the gap 126. Although the holes 11 are depicted as being perpendicular to inner surface 122, they may also be angled, as discussed above and shown for example in FIG. 4. More particularly, for the embodiment illustrated in FIG. 8, the gap 126 is configured to exhaust flow at the outlet end 128 of the pulse detonation chamber 120. Still more particularly, for the embodiment illustrated in FIG. 8, the gap 126 is further configured to be in fluid communication with a bypass flow outside of the inner liner of pulse detonation chamber 120. For example, as shown in FIG. 8, bypass flow enters the gap 126 through an opening 129, or the bypass flow enters from an annular passage upstream of the porous section. Beneficially, this configuration purges the porous liner 10 with cooling air from the bypass flow, cooling the porous liner 10 and chamber 120. For the particular embodiment illustrated in FIG. 7, the pulse detonation chamber 120 further includes a damping material 22 situated within the gap 126. To show the gap 126, FIG. 7 shows the damping material 22 only in the upper portion of the cross-section, for illustrative purposes only. However, in practice, the damping material 22 is distributed throughout the gap 126. Exemplary damping materials 22 include beads formed of heat resistant materials, such as ceramics. Beneficially, the damping material 22 further weakens the detonation. In addition to the embodiments described above, each of the pulse detonation chambers 120 may be equipped with several porous liners 10 and define several gaps 126, as illustrated for example in FIG. 9. Although depicted in FIG. 9 as being open to bypass flow, the gaps may be closed, as shown in FIG. 7. In addition, the gaps 126 may be filled with damping materials 22, as shown in FIG. 7. The exemplary staggered arrangement shown in FIG. 9 enhances heat transfer. The end of the liner 10 may be open or closed.

Figure 10:
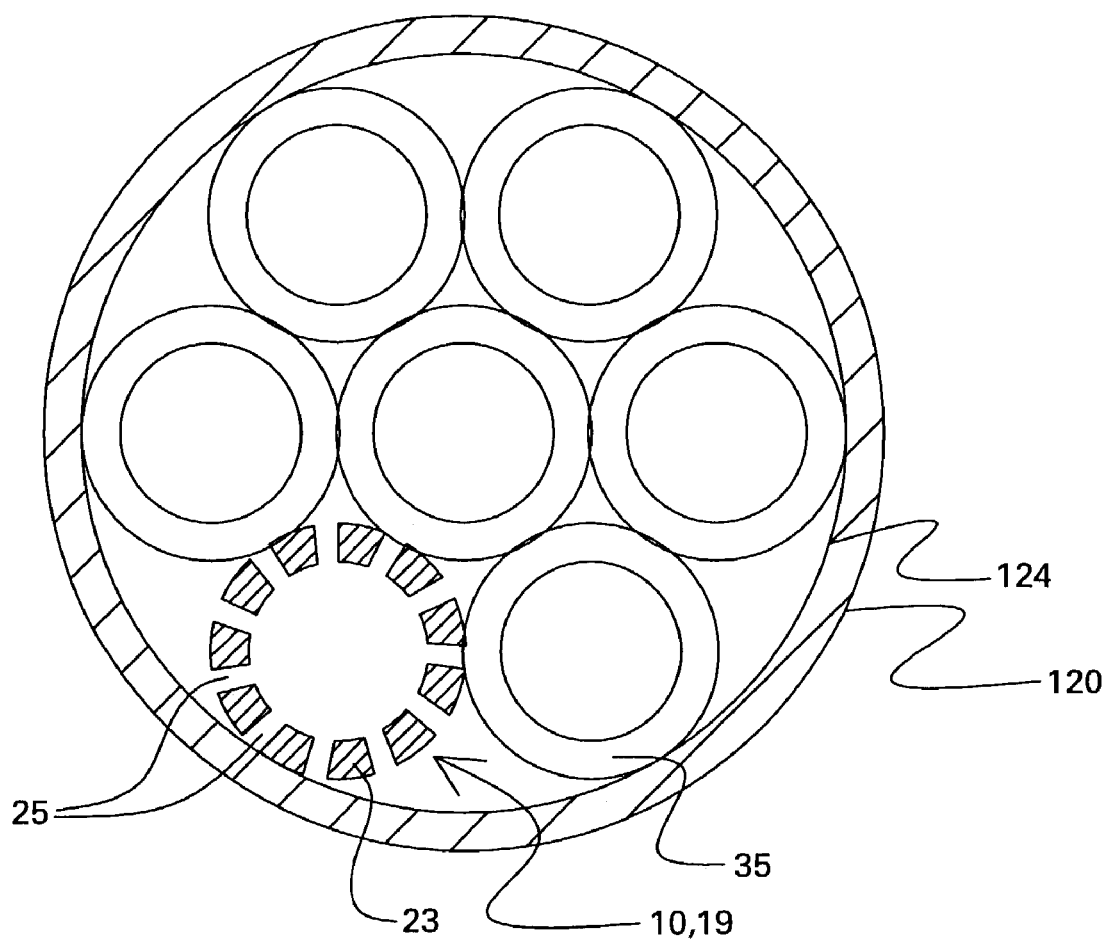
FIG. 10 illustrates a porous insert embodiment of the porous liner, in a cross-sectional view.

Another embodiment is shown in cross-sectional view in FIG. 10, for which the porous liner 10 comprises a porous insert 19. The porous insert 19 extends along a downstream portion of the pulse detonation chamber 120 in a vicinity of the outlet end of the PDC 120, in the same manner as shown for the porous liner 10 in any of FIGS. 1 and 3–9. For the particular embodiment shown in FIG. 10, the porous insert 19 comprises a number of flow tubes 35. Each of the flow tubes 35 has a wall 23, which defines a number of holes 25. More particularly, each of the flow tubes 35 has a wall 23 defining a number of through-holes 25 extending through the wall 23 of the flow tube 35, as shown. Alternatively, the walls 23 may define blind holes (not shown). As used herein, the term "tube" includes pipes having circular or non-circular cross-sections. Exemplary tubes include the cylindrical tubes shown in FIG. 10, as well as tubes having polygonal cross sections (not shown), for example hexagonal tubes, which may be closely packed or separated by open volumes.

Figure 11:
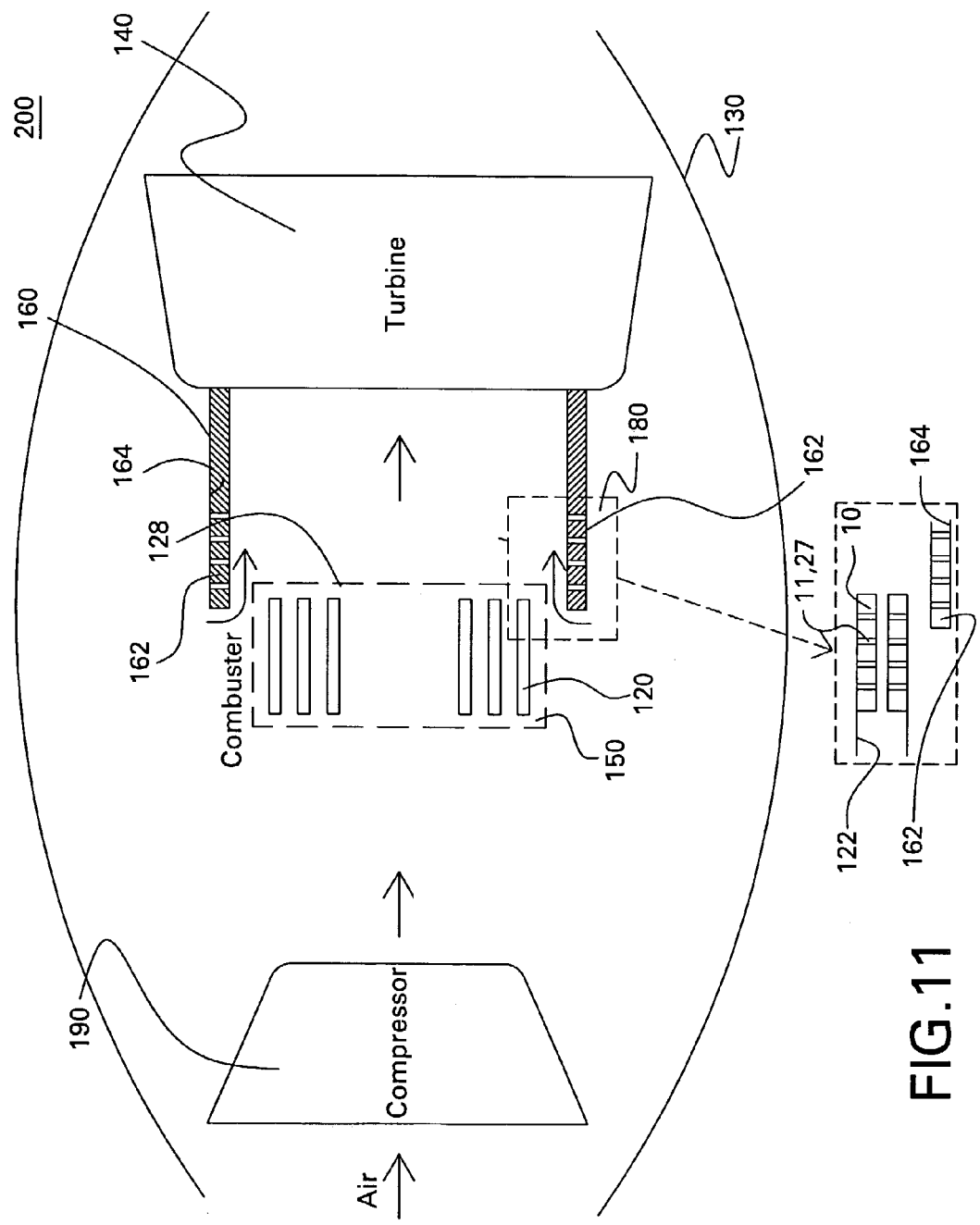
FIG. 11 illustrates a hybrid engine embodiment of the invention.

Another engine 200 embodiment is illustrated in FIG. 11. As shown, the engine 200 further includes a turbine subsystem 140 positioned downstream from the pulse detonation chamber(s) 120. The turbine subsystem 140 is in flow communication with the pulse detonation chamber(s) 120 and is housed within the casing 130. For this configuration, the engine 200 is a hybrid pulse detonation-turbo engine. For this embodiment, the pulse detonation chamber(s) 120 form a combustor 150, which drives the turbine sub-system 140. One exemplary turbine subsystem 140 includes a high-pressure turbine (not shown) and/or a power turbine or a low-pressure turbine (not shown) arranged in a serial flow relationship power turbine or a low-pressure turbine (not shown) arranged in a serial flow relationship with combustor 150. According to a particular embodiment, a compressor 190 compresses an oxidizer, such as air, and supplies the compressed oxidizer to the pulse detonation chamber(s) 120, as indicated in FIG. 11. More particularly, the engine 200 illustrated in FIG. 11 further includes a transition piece 160 positioned between the pulse detonation chamber(s) 120 and the turbine sub-system 140. The transition piece 160 is configured to modify the velocity profile of the high-pressure gas exiting the pulse detonation chamber(s). In order to further dampen detonations, the transition piece 160 has a porous liner 162, which is adapted to fit within an inner surface 164 of the transition piece 160 downstream from the outlet end 128 of the pulse detonation engine(s) 120, according to a more particular embodiment. By "downstream" it is meant that the porous liner 162 at least extends to a point downstream of the outlet end 128 of the pulse detonation engine(s) 120. Depending on the application, the entire porous liner 162 may be positioned downstream of the outlet end 128, or the porous liner 162 may extend between a point upstream of the outlet end 128 to a point downstream of the outlet end 128. By the phrase "adapted to fit," it should be understood that the porous liner 162 may be integral to the transition piece 160, as shown, or may be a separate piece affixed to the inner surface 164 of the transition piece 160. Porous liners 10 and 162 are collectively indicated as detonation damper 180 in FIG. 11. Detonation damper 180 is adapted to dampen a number of shock waves generated by the pulse detonation chambers(s) 120 and to thereby reduce the transient load on turbine subsystem 140. Exemplary detonation dampers 180 include porous liner 10 and porous liner 162, both alone and in combination.

Figure 12:
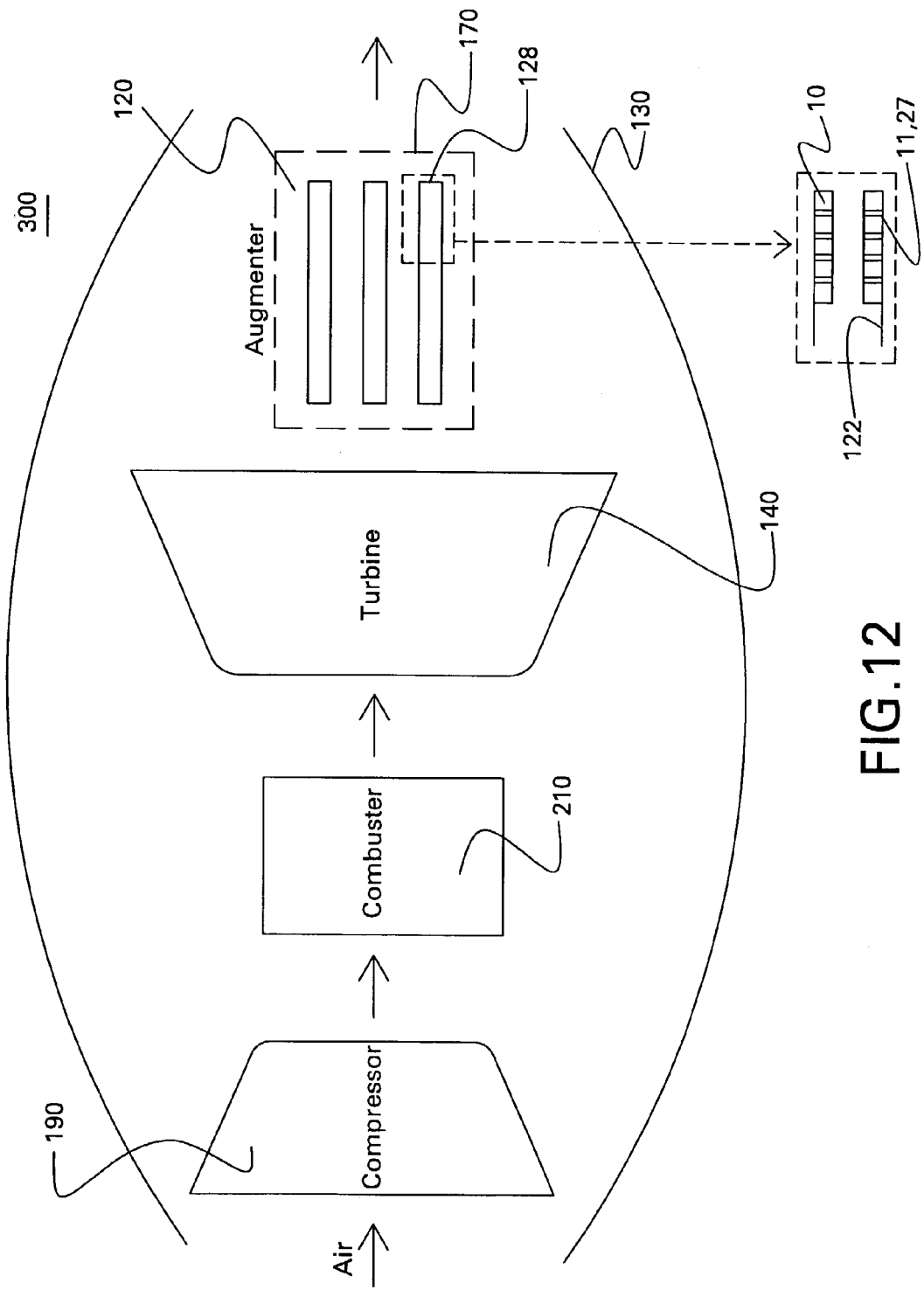
FIG. 12 illustrates another hybrid engine embodiment of the invention.

Another engine 300 embodiment is illustrated in FIG. 12. As shown, the engine 300 further includes a turbine subsystem 140, which is positioned upstream of the pulse detonation chamber(s) 120 and is in flow communication with the pulse detonation chamber(s) 120. The casing 130 houses the turbine sub-system 140. Like the embodiment described above with respect to FIG. 11, the engine 300 is a hybrid pulse detonation-turbo engine. For this configuration, the pulse detonation chamber(s) 120 form an augmentor 170, which receives gas flow from the turbine sub-system 140. The turbine sub-system 140 is driven by a combustor 210. The combustor 210 may be a conventional combustor or may comprise pulse detonation chambers. The gas flow is mixed with additional fuel and detonated in the augmentor 170 to generate engine thrust. As noted above, an exemplary turbine subsystem 140 includes a high-pressure turbine (not shown) and/or a power turbine or a low-pressure turbine (not shown) arranged in a serial flow relationship with the augmentor 170. According to a particular embodiment, a compressor 190 compresses an oxidizer, such as air, and supplies the compressed oxidizer to the PDC and turbine sub-system 140, as indicated in FIG. 12. For the configuration of FIG. 12, the porous liner 10 desirably reduces noise from the augmentor 170. In addition, the porous liner could be part of the augmentor liner 170.

Figure 13:
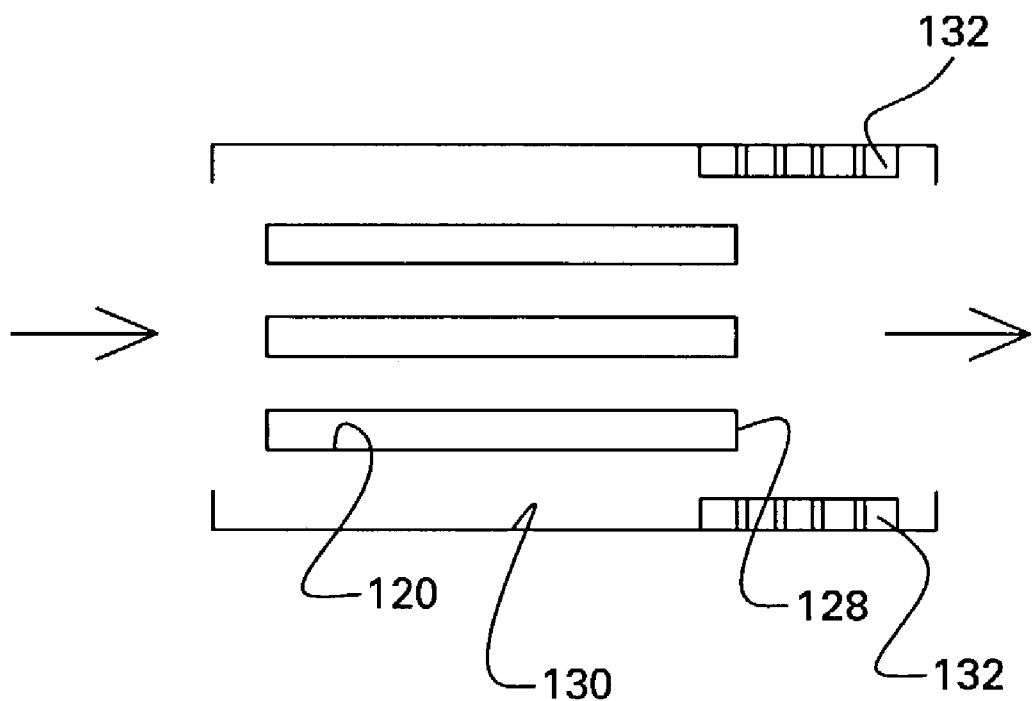
FIG. 13 illustrates another engine embodiment of the invention.

Another engine 500 embodiment is illustrated in FIG. 13. As shown, the engine 500 includes at least one pulse detonation chamber 120, which is configured to receive and detonate a fuel and an oxidizer and has an outlet end 128. The engine also includes a casing 130 housing the pulse detonation chamber(s) 120. The casing 130 has a porous liner 132, which is adapted to fit within an inner surface 134 of the casing 130 downstream of the outlet end 128 of the pulse detonation engine(s) 120. As noted above, the term "downstream" encompasses the porous liner 132 (1) beginning and ending at points downstream of the outlet end 128 and (2) beginning at a point upstream of the outlet end 128 and ending at a point downstream of the outlet end 128. In other words, at least a portion of the porous liner 132 is downstream of the outlet end 128 of the pulse detonation chamber(s) 120. By the phrase "adapted to fit," it should be understood that the porous liner 132 may be integral to the casing 130 or may be a separate piece affixed to the inner surface 134 of the casing 130, as shown. Beneficially, the porous liner 132 damps shock waves, thereby reducing noise. For the particular embodiment shown in FIG. 13, the pulse detonation chamber 120 comprises porous liner 10 (described above with respect to FIG. 1), to further dampen the detonations. For the embodiment depicted by FIG. 13, the pulse detonation chambers 120 may form a combustor, augmentor or both.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An engine comprising:
   at least one pulse detonation chamber configured to receive and detonate a fuel and an oxidizer, said pulse detonation chamber having an outlet end and comprising a porous liner adapted to fit within an inner surface of said pulse detonation chamber within a vicinity of said outlet end; and
   a casing housing said at least one pulse detonation chamber.

2. The engine of claim 1, wherein said porous liner is shorter than said pulse detonation chamber.

3. The engine of claim 1, wherein said porous liner comprises a perforated liner attached to said inner surface of said pulse detonation chamber.

4. The engine of claim 3, wherein said perforated liner comprises a material selected from the group consisting of metals, metal alloys, ceramics, and combinations thereof.

5. The engine of claim 3, wherein said perforated liner defines a plurality of holes oriented perpendicular to a surface of said perforated liner.

6. The engine of claim 3, wherein said perforated liner has a surface normal and defines a plurality of holes angled relative to the surface normal.

7. The engine of claim 3, wherein said perforated liner defines a plurality of holes and has a porosity of at least about thirty percent (30%).

8. The engine of claim 7, wherein said perforated liner has a porosity in a range of about fifty percent (50%) to about seventy percent (70%).

9. The engine of claim 3, wherein said perforated liner defines a plurality of annular cavities.

10. The engine of claim 1, wherein said porous liner comprises a porous section of a wall of said pulse detonation chamber.

11. The engine of claim 1, wherein said porous liner comprises a metal fiber material, said metal fiber material being affixed to the inner surface of said pulse detonation chamber.

12. The engine of claim 1, wherein said porous liner and the inner surface of said pulse detonation chamber are separated by a gap, and wherein said porous liner is in fluid communication with said gap.

13. The engine of claim 12, wherein said gap is configured to exhaust flow at the outlet end of said pulse detonation chamber.

14. The engine of claim 13, wherein said gap is further configured to be in fluid communication with a bypass flow outside of said pulse detonation chamber.

15. The engine of claim 12, wherein said pulse detonation chamber further comprises a damping material situated within said gap.

16. The engine of claim 1, wherein said porous liner comprises a porous insert.

17. The engine of claim 16, wherein said porous insert comprises a plurality of flow tubes, each of said flow tubes having a wall defining a plurality of holes.

18. The engine of claim 17, wherein said holes comprise through-holes extending through a respective one of said walls.

19. The engine of claim 1, further comprising a turbine sub-system positioned downstream from said at least one pulse detonation chamber, said turbine subsystem being in flow communication with said at least one pulse detonation chamber and being housed within said casing.

20. The engine of claim 19 further comprising a transition piece positioned between said at least one pulse detonation chamber and said turbine sub-system and being configured to modify a velocity profile of a high pressure gas exiting said at least one pulse detonation chamber.

21. The engine of claim 20, wherein said transition piece comprises a porous liner adapted to fit within an inner surface of said transition piece downstream from said outlet end of said at least one pulse detonation chamber.

22. The engine of claim 1, further comprising a turbine sub-system positioned upstream of said at least one pulse detonation chamber and in flow communication with said at least one pulse detonation, wherein said casing houses said turbine sub-system.

23. An engine comprising:
   at least one pulse detonation chamber configured to receive and detonate a fuel and an oxidizer, said pulse detonation chamber having an outlet end;
   a transition piece disposed downstream from said pulse detonation chamber and being configured to modify a velocity profile of a high pressure gas exiting said pulse detonation chamber; and
   a detonation damper adapted to dampen a plurality of shock waves generated by said pulse detonation chamber, wherein said detonation damper comprises a porous liner adapted to fit within an inner surface of said pulse detonation chamber within a vicinity of said outlet end.

24. The engine of claim 23, further comprising a turbine sub-system disposed downstream from said transition piece, wherein said pulse detonation chamber, said transition piece and said turbine sub-system are arranged in a serial flow relationship.

25. An engine comprising:
   at least one pulse detonation chamber configured to receive and detonate a fuel and an oxidizer, said pulse detonation chamber having an outlet end;
   a transition piece disposed downstream from said pulse detonation chamber and being configured to modify a velocity profile of a high pressure gas exiting said pulse detonation chamber; and
   a detonation damper adapted to dampen a plurality of shock waves generated by said pulse detonation chamber, wherein said detonation damper comprises a porous liner adapted to fit within an inner surface of said transition piece downstream from said outlet end of said at least one pulse detonation chamber.

26. The engine of claim 25, wherein said detonation damper further comprises a porous liner adapted to fit within an inner surface of said detonation chamber within a vicinity of said outlet end.

27. An engine comprising:
   at least one pulse detonation chamber configured to receive and detonate a fuel and an oxidizer, said pulse detonation chamber having an outlet end; and
   a casing housing said at least one pulse detonation chamber, said casing comprising a porous liner adapted to fit within an inner surface of said casing downstream of said outlet end,
   wherein said pulse detonation chamber comprises a porous liner adapted to fit within an inner surface of said pulse detonation chamber within a vicinity of said outlet end.

* * * * *